(12) United States Patent
Teng et al.

(10) Patent No.: US 7,333,869 B2
(45) Date of Patent: Feb. 19, 2008

(54) DESIGNING VEHICLE MANUFACTURING WORKSTATIONS USING ERGONOMIC DESIGN RULES

(75) Inventors: Yu J Teng, Sterling Heights, MI (US); Yun Lu, Troy, MI (US); William J Guerra, Troy, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/185,608

(22) Filed: Jul. 20, 2005

(65) Prior Publication Data

US 2007/0021854 A1   Jan. 25, 2007

(51) Int. Cl.
G06F 19/00 (2006.01)
G06G 7/48 (2006.01)

(52) U.S. Cl. .............................. 700/103; 700/97; 703/8

(58) Field of Classification Search .................. 700/97, 700/103–105; 703/8
See application file for complete search history.

(56) References Cited

U.S. PATENT DOCUMENTS 6,654,653 B1 * 11/2003 Heneveld et al. ............. 700/97

2006/0155402 A1 * 7/2006 Read ........................... 700/97

FOREIGN PATENT DOCUMENTS

WO      WO 03/046672      *  6/2003

* cited by examiner

*Primary Examiner*—Ryan A. Jarrett
(74) *Attorney, Agent, or Firm*—Ralph E. Smith (57) ABSTRACT

A computer-implemented-ergonomic system for designing manufacturing workstations is provided. The system includes a data store for storing a plurality of workstation templates. Each workstation template includes parameters for a particular type of manufacturing workstation. Additionally, the system provides a data store for storing vehicle data indicative of a vehicle to be manufactured in the workstation. In another aspect of the present invention, the system includes a configuration subsystem adaptive to receive vehicle data and at least one workstation template and operative to configure the workstation template for the vehicle. Additionally, the system provides a data store for storing ergonomic design rules that govern a design of a manufacturing workstation. The system further includes an evaluation subsystem adaptive to receive the ergonomic design rules in data communication with the configuration subsystem. The evaluation subsystem is further operable to evaluate a configured workstation template in relation to the ergonomic design rules.

11 Claims, 13 Drawing Sheets

DESIGNING VEHICLE MANUFACTURING WORKSTATIONS USING ERGONOMIC DESIGN RULES

FIELD OF THE INVENTION

The present invention relates to ergonomic systems or more specifically, a computer integrated knowledge-based ergonomic system for a manufacturing assembly process.

BACKGROUND OF THE INVENTION

Ergonomic design rules provide uniform ergonomic design criteria for manufacturing, assembly, powertrain, and components operations. Such criteria are generally supplied to engineers, designers, builders, vendors, suppliers, contractors etc. to aid them in the proper designing of a manufacturing workstation in order to build a product or component. The ergonomics of the manufacturing workstation must also consider back-up provisions as well as maintenance access and activities.

Generally, however, the ergonomic design rules are implemented too late in the design and manufacturing process after the manufacturing workstation and the product has been built. This late implementation is due to a lack of communication in upstream design process and downstream manufacture process. Due to the lack of communication, ergonomic concerns may not be addressed until the product and design processes are completed. Solving ergonomic problems downstream, however, requires costly changes to the manufacturing workstation. It is also very expensive to build physical prototypes builds for design and process validation.

Therefore, it is desirable to provide a computer-implemented ergonomic system to evaluate ergonomic design rules in relation to a manufacturing workstation and a vehicle during the product and process design phase.

SUMMARY OF THE INVENTION

In accordance with the present invention, a computer-implemented ergonomic system for designing manufacturing workstations is provided. The system includes a data store for storing a plurality of workstation templates. Each workstation template includes parameters for a particular type of manufacturing workstation. The system also provides a data store for storing vehicle data indicative of a vehicle to be manufactured in the manufacturing workstation. In another aspect of the present invention, the system includes a configuration subsystem adaptive to receive vehicle data and at least one workstation template and operative to configure the workstation template for the vehicle. Additionally, the system provides a data store for storing ergonomic design rules that govern a design of a manufacturing workstation. The system further includes an evaluation subsystem adaptive to receive the ergonomic design rules and, in data communication with the configuration subsystem, to receive data relating to a configured workstation template. After receiving the ergonomic design rules and data relating to a configured workstation template, the evaluation subsystem is operable to evaluate the configured workstation template in relation to the ergonomic design rules.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
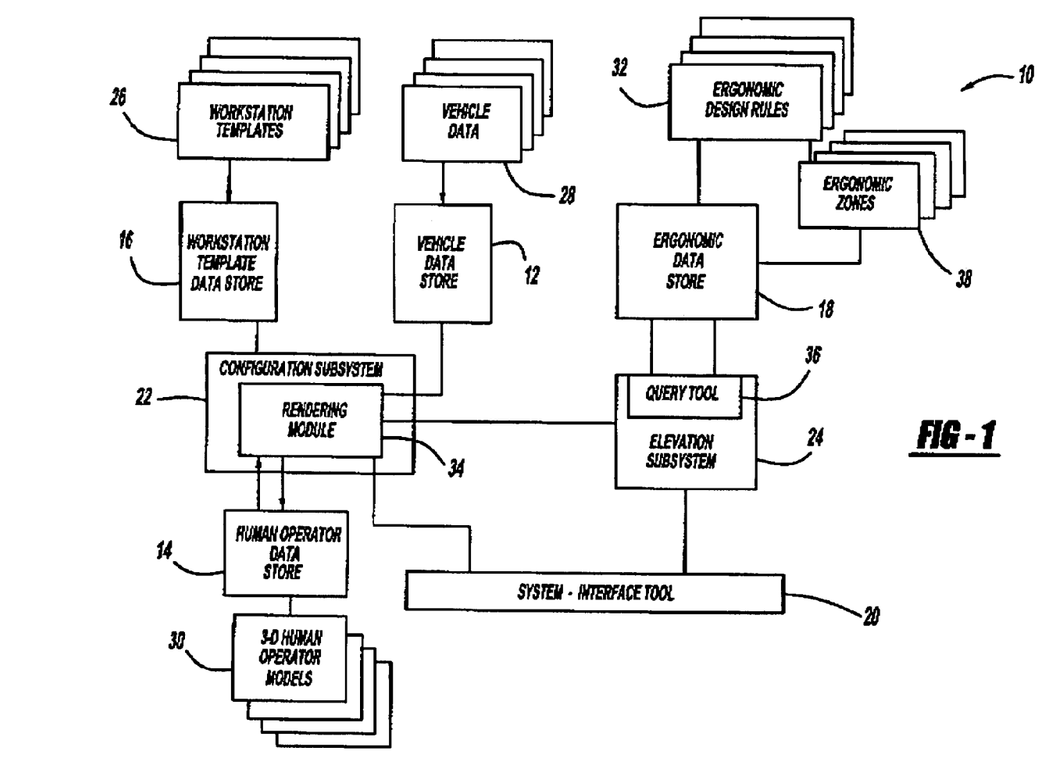
FIG. 1 is a block diagram of a computer-implemented ergonomic system in accordance with the present invention.

Referring to FIG. 1, a computer-implemented ergonomic system 10 for designing manufacturing workstations is provided. The computer-implemented ergonomic system 10 includes a vehicle data store 12, a human-operator data store 14, a workstation template data store 16, an ergonomic rules data store 18, a system-interface tool 20, a configuration subsystem 22, and an evaluation subsystem 24. The vehicle data store 12, the human-operator data store 14, the workstation template data store 16 are each coupled to the configuration subsystem 22. The system-interface tool 20 is coupled to the configuration subsystem 22 and the evaluation subsystem 24. The configuration subsystem 22 is, in turn, coupled to the evaluation subsystem 24. The evaluation subsystem 24 is, in turn, coupled to the ergonomic rules data store 18.

The workstation template data store 16 stores a plurality of workstation templates 26. Each workstation template 26 includes a three-dimensional model of a particular type of the manufacturing workstation. The manufacturing workstation is a specific workstation in a vehicle assembly line that is a particular part or system assembled for a particular vehicle, such as a chassis workstation, a door line workstation, a trim workstation, etc. Each workstation template 26 further includes a set of manufacturing process steps that are related and should be performed at the specific workstation.

Figure 4:
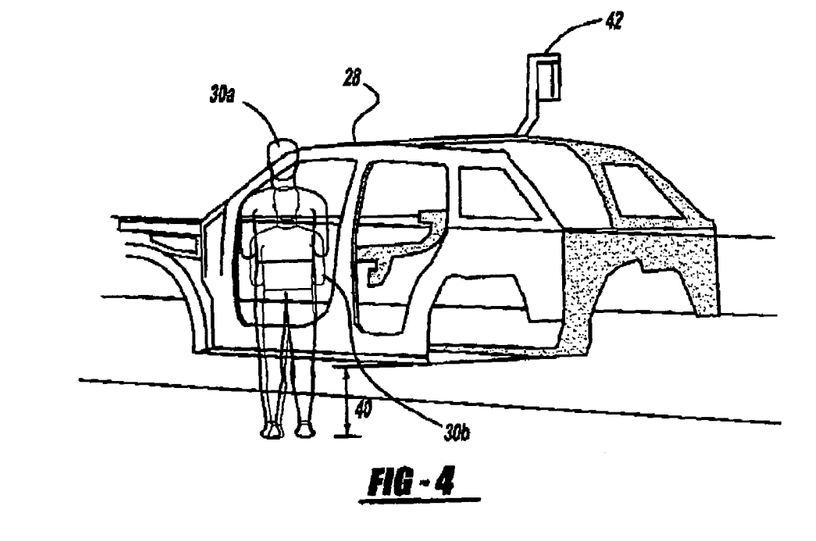
FIG. 4 is a perspective view of a selected workstation template along with actual vehicle data replacing vehicle reference parameters.

In addition to the set of manufacturing process steps, each workstation template 26 includes a set of parameters that may be modified to perform a specific task of the manufacturing process called vehicle reference parameters. The vehicle reference parameters may include parameters such as a sill height 40, a carrier device 42, a component location (not shown), a large male operator 30a, and a small female operator 30b (FIG. 4). While these parameters are specific examples of vehicle reference parameters, one of ordinary skill in the art can recognize that the vehicle reference parameters may also include one or more than two human-operator models 30, or any dimensions related to the carrier device. Unless the vehicle reference parameters are modified, the vehicle reference parameters remain at a preset determined default values or parameters. The large male operator 30a and the small female operator 30b each include an operator identifier, where the operator identifier corresponds to a specific human-operator model 30 stored within the human-operator data store 14. Human-operator models 30 will be further discussed later.

The vehicle data store 12 stores a plurality of three-dimensional vehicle model data 28. Each three-dimensional vehicle model data 28 is indicative of a vehicle, vehicle platform or vehicle program to be manufactured in one of the plurality manufacturing workstations. Each vehicle model data 28 also includes a vehicle identifier, where the vehicle identifier is used by the system 10 to request and retrieve specific vehicle model data 28.

The human-operator data store 14 stores a plurality of human-operator models 30 including the large male operator 30a and the small female operator 30b. While the large male operator 30a and the small female operator 30b are specific examples of the human-operator models 30, one of ordinary skill in the art can appreciate that many different physical and gender combination models may be included within the plurality of human-operators models 30. For example, the human-operator models 30 may also include a medium male operator, a small male operator, a large female operator, a medium female operator, as well as, a 5 percentile male or female operator, a 25 percentile male or female operator, a 50 percentile male or female operator, a 75 percentile male or female operator, and a 90 percentile male or female operator. Each human-operator model 30 includes a three-dimensional model of a human operator and the operator identifier, wherein the human operator conducts one of a multiple of steps related to manufacturing a vehicle in a manufacturing workstation. The operator identifier is used by the system 10 to request and retrieve a specific human-operator model 30. Additionally, the human-operator model 30 may include instructions to simulate movements and functions of a real-life human operator performing or completing a range of motion to complete the manufacturing task or function related to the manufacturing workstation.

Each human-operator model 30 is configured to operate in an extreme posture position. The extreme posture position is achieved by vertically aligning different parts of the operator's body, such as the head, shoulders, abdomen, and the hips, to allow for a natural curve of the spine with minimal or no distortions. In the extreme posture position, the back of the human-operator model 30 is erect and upright when standing or sitting to perform a task or function related to one of the plurality manufacturing workstations. Additionally, although each human-operator model 30 may be configured having the extreme posture position, one of ordinary skill can recognize that each human-operator model 30 may be positioned in a plurality of different positions such as positioning the back of the human-operator model 30 at different angles from the extreme posture position. For example, each human-operator model 30 may be positioned at 10°, 20°, 30°, etc. from the extreme posture position. Additionally, each human-operator model 30 may include a position where a selected human-operator model 30 must bend up and/or down using the knees of the selected human-operator model 30.

The ergonomic rules data store 18 comprises a plurality of ergonomic design rules 32 that provide uniform ergonomic design criteria for manufacturing, assembly, powertrain, and components operations. The ergonomic design rules 32 govern the design of each manufacturing workstation. Each ergonomic design rule 32 includes an identification number, a workstation identifier, rule data, at least one keyword identifier, and at least one sub-keyword identifier. The identification number links a specific design rule to a rule pop-up function/feature related and used in a query function to retrieve a portion of the ergonomic design rules 32 based on the identification number input by the system user.

Additionally, the keyword identifier and/or the sub-keyword identifier links a specific ergonomic design rule 32 to a specific key word and/or sub-keyword related and used in the query function to retrieve a portion of the ergonomic design rules 32 based on the keyword and/or sub-keyword input by the system user. The workstation identifier links a particular ergonomic design rule 32 to a specific workstation template 26. Additionally, some ergonomic design rules 32 may also include an ergonomic zone identifier. Likewise, the ergonomic zone identifier links a specific ergonomic design rule 32 to a specific ergonomic zone related and used to retrieve a portion of the ergonomic design rules 32 based on a selected ergonomic zone input by the system user. Ergonomic zones 38 and ergonomic zone identifiers will be further discussed later.

As previously mentioned, each ergonomic design rule 32 includes the rule data. The rule data includes a specific rule that governs the design of the manufacturing workstation. The specific rule is either a non-quantitative rule or a quantitative rule. The non-quantitative rule includes at least one ergonomic design rule 32 that is used to warn or remind a system user of a condition to minimize, eliminate, or avoid while designing the specific manufacturing workstation. The non-quantitative rule may state, for example: minimize the frequency of lifts or lowers, consider automating or purchasing for assembly of highly repetitive tasks, or provide artificial lights with minimum shadows and glare if required. Although specific examples have been stated, one of ordinary skill in the art can recognize that the non-quantitative rules may include any non-quantitative ergonomic design rule 32 related to manufacturing processes. Additionally, one of ordinary skill in the art can understand that some non-quantitative rules may be converted into a quantitative rule using one or multiple algorithms.

On the other hand, the quantitative rule includes at least one ergonomic design rule 32 that defines a threshold for at least one of the vehicle reference parameters associated with a particular workstation template. For example, the quantitative rule may state: the normal viewing distance is 46 cm (18") with a minimum of 33 cm (13") and a maximum of 71 cm (28"), for production task the maximum cyclic two handed lift is 9 kg (20 lbs), or maximum horizontal reach measured from the edge of any barrier (tool, fixture, vehicle, etc.) between the worker and the task when lifting is 51 cm (20"). Although specific examples of quantitative rules have been stated, one or ordinary skill will recognize that quantitative rules include any quantitative ergonomic design rules 32 related to manufacturing processes.

Additionally, some ergonomic design rules 32 that may not include a quantitative value may be classified, however, as a quantitative rule. One reason for such a classification is that the specific rule may include limitations or thresholds that are not quantitative, but limit or restrict movement, position, or placement of the human-operator model 30.

Figure 2A:
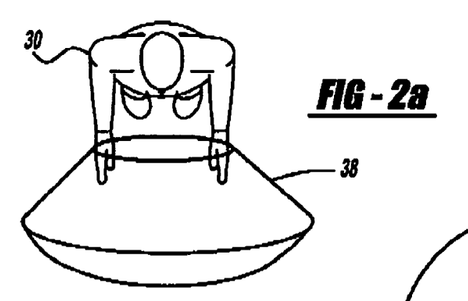
FIG. 2a is a top view of a first three-dimensional zone model in accordance with the present invention.
Figure 2B:
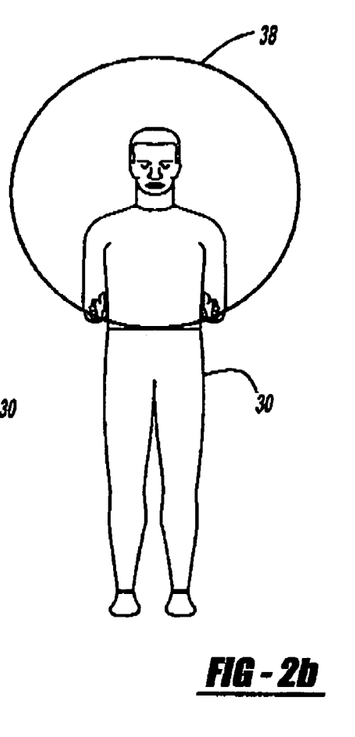
FIG. 2b is a front view of the first three-dimensional zone model in accordance with the present invention.
Figure 2C:
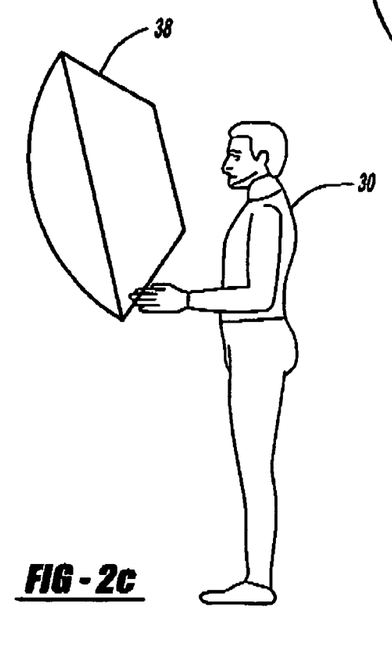
FIG. 2c is a side view of the first three-dimensional zone model in accordance with the present invention.
Figures 3A, 3B, 3C:
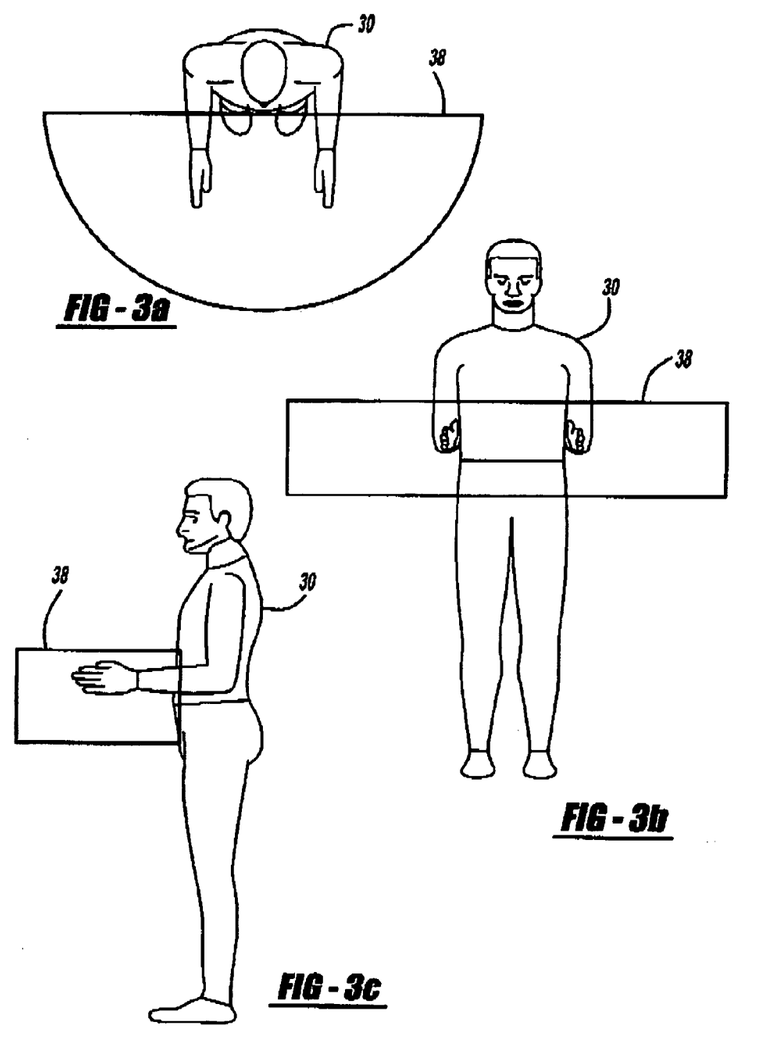
FIG. 3a is a top view of a second three-dimensional zone model in accordance with the present invention.
FIG. 3b is a front view of the second three-dimensional zone model in accordance with the present invention.
FIG. 3c is a side view of the second three-dimensional zone model in accordance with the present invention.

Referring to FIGS. 2 and 3, at least one quantitative rule may be converted into a three-dimensional region model defined by threshold parameters of a specific rule for the human-operator model 30 called ergonomic zones 38. Additionally, the ergonomic zones 38 are also stored in the ergonomic rules data store 18. The following is an example of the quantitative rule that may be converted into an ergonomic zone 38: the normal viewing distance is 46 cm (18") with a minimum of 33 cm (13") and a maximum of 71 cm (28") (FIGS. 2a-2c) or the recommended work envelope (location of hands when working) is between 91-122 cm (FIGS. 3a-3c). Although specific examples of quantitative rules have been used and converted into the ergonomic zone 38, one of ordinary skill can recognize that any quantitative or non-quantitative ergonomic design rule 32 may be converted into one of a plurality of ergonomic zones 38. Each ergonomic design rule 32 that is converted into the ergonomic zone 38 includes an identifying description called the ergonomic zone identifier. The ergonomic zone identifier is used by the system 10 to request and retrieve the selected ergonomic zone.

The ergonomic design rules 32 may be structured into a hierarchy system that correlates to the identification number. Based on the hierarchy system, the ergonomic design rules 32 are arranged by a category, a sub-category, and/or a plurality of smaller categories of the sub-category. Additionally, the identification number identifies the category, the sub-category, and each of the plurality of smaller categories.

The system-interface tool 20 is adaptive to allow the system user to select vehicle model data 28 identifying a particular vehicle contained in the vehicle data store 12. The system-interface tool 20 is further operative to send a retrieval request for the vehicle model data 28 representing a selected vehicle, the particular workstation template, and at least one operator model 30 from the rendering module 34 of the configuration subsystem 22. The system-interface tool 20 is also adaptive to allow the system user to send a modify request to the configuration subsystem 22 to change or modify the vehicle reference parameters before and after an evaluation for a specific workstation template. Additionally, the system-interface tool 20 is operative to allow the system user to send one or more ergonomic zone requests based on specific ergonomic zone identifiers to request selected ergonomic zones 38. The system-interface tool 20 is also adaptive to allow the system user to send an evaluation request to the evaluation subsystem 24 to evaluate a configured workstation template. Additionally, the system-interface tool 20 is adaptive to allow the system user to save a current study of the configured workstation template.

The configuration subsystem 22 is adaptive to receive the retrieval request sent by the system user via the system-interface tool 20 for a selected vehicle model data 28, a selected workstation template along with generic or default vehicle reference data. The configuration subsystem 22 retrieves and receives the selected vehicle model data 28 and a selected workstation template. Additionally, the configuration subsystem 22 is operative to configure the selected workstation template for the selected vehicle. More specifically, a rendering module 34 of the configuration subsystem 22 is configured to receive an input indicative of the selected workstation template by the system user and operable to display the three-dimensional model 28 of the selected vehicle residing in the selected workstation template. The rendering module 34 retrieves the selected workstation template from the workstation template data store 16. Upon retrieving the selected workstation template, the rendering module 34 is also operative to retrieve and display the two default human-operator models 30 using the two human identifiers included within the selected workstation template. Additionally, the rendering module 34 retrieves the selected vehicle model data 28 from the vehicle data store 12.

Additionally, upon receipt of the modify signal, the rendering module 34 is adapted to modify or change the vehicle reference parameters of the configured workstation template 26. Upon receiving the retrieval request from the system-interface tool 20 for a specific human-operator model 30, the rendering module 34 retrieves and receives the specific operator model 30 from the human-operator data store 14. The rendering module 34 configures the selected workstation template for the specific vehicle 28. For example, the vehicle parameters may include a default sill height 40 of 24 inches, a default carrier device 42, and default human-operator models 30. Upon loading the specific vehicle, however, the vehicle reference parameters including the sill height and the carrier device may be modified, such that the sill height is modified to 20 inches or the default carrier device may be changed to a new carrier device for the specific vehicle. Once the configured workstation template is obtained, the rendering module 34 displays the specific vehicle in the configured workstation template along with the selected operator model 30. Additionally, the rendering module 34, in data communication with the evaluation subsystem 24, is operative to send the workstation identifier to the evaluation subsystem 24.

Upon receipt of the workstation identifier, the evaluation subsystem 24 is adaptive to receive the ergonomic design rules 32 related to the selected workstation, wherein the evaluation subsystem 24 is operable to evaluate the configured workstation template in relation to the ergonomic design rules 32. The evaluation subsystem 24 is further operative to display the ergonomic design rules 32 related to the configured workstation template in conjunction with the configured workstation template. The evaluation subsystem 24 is further operative to perform the query function using an interactive-query tool 36. The interactive-query tool 36 is configured to present all, a set or a subset of the ergonomic design rules 32 to the system user. Additionally, the interactive-query tool 36 allows the system user to further define the ergonomic design rules 32 and retrieve the set or the subset of the ergonomic design rules 32 needed for a particular ergonomic study using a selected keyword and/or a selected sub-keyword. The interactive-query tool 36 utilizes a plurality of predefined keywords and a plurality of predefined sub-keywords to be selected by the system user. Each keyword is linked to a particular ergonomic design rule 32 via the keyword identifier. Additionally, each sub-keyword is linked to a particular ergonomic design rule 32 via the sub-keyword identifier. Using the interactive-query tool 36, the system user is also allow to retrieve one or several ergonomic design rules 32 using the identification number of a specific ergonomic design rule 32 via the rule pop-up feature/function.

After retrieving a queried list of the ergonomic design rules 32, the evaluation subsystem 24 displays the queried list to the system user, wherein the queried list is retrieved using the interactive-query tool 36 or only the workstation identifier. Upon receipt of the evaluation request sent by the system-interface tool 20, the evaluation subsystem 24 is operative to automatically compare the queried list of the ergonomic design rules 32 to the configured workstation template to develop an assessment for the system user.

The evaluation subsystem 24 is adaptive to inform the system user of the assessment, after the evaluation subsystem 24 evaluates the configured workstation template in relation to the ergonomic design rules 32. Additionally, the evaluation subsystem 24 is further operative to inform the user when the configured workstation template violates at least one of the ergonomic design rules 32. The assessment allows the user to understand whether the configured workstation with the specific vehicle violates any rule included within the queried list of the ergonomic design rules 32. The assessment also indicates to the system user whether a design change or multiple design changes are needed for the configured workstation template.

The assessment may include a matrix chart that identifies each ergonomic rule 32 tested, tested components or parameters of the configured workstation template or the vehicle, and a result indicator. Additionally, each violated ergonomic design rule 32 is linked with a component and/or the parameters of the configured workstation. The result indicator allows the system user to determine a proper assessment of the configured workstation template and the ergonomic design rules 32 indicating a passed mark, a failed mark, or a warning mark. The passed mark indicates that a design change is not needed. The failed mark indicates that a design change is needed. The warning mark indicates that a design change may be needed, but is not necessary. Additionally, the result indicator may be color-coded. For example, a green indicator may be indicative of the passed mark. A yellow indicator may be indicative of the warning mark. Additionally, a red indicator may be indicative of the failed mark.

Additionally, the evaluation subsystem 24 may evaluate the configured workstation template using selected ergonomic zones 38. Upon receipt of an ergonomic zone request or multiple ergonomic zone requests for one or more selected ergonomic zones 38, the evaluation subsystem 24 is operative to retrieve and place each selected three-dimensional ergonomic zone 38 adjacent to the selected operator 30 to determine whether the configured workstation violates the threshold parameters of each selected ergonomic zone 38. The evaluation subsystem 24 positions the selected operator 30 in a location to perform the selected feature or function in the manufacturing process related to the configured workstation and the selected vehicle 28.

Using each selected ergonomic zone 38, the evaluation subsystem 24 is operative to evaluate a clearance or interference check of the selected operator 30, while located adjacent to the selected ergonomic zone 38. Additionally, the evaluation subsystem 24 is further operative to evaluate an ergonomic design rule 32 checking of the selected operator 30 with the three-dimensional ergonomic zone 38 placed adjacent to the selected operator 30. After comparing each selected ergonomic zone 38 adjacent to the selected operator 30 with the configuration workstation, the evaluation subsystem 24 is further operative to produce the assessment.

The assessment of each selected ergonomic zone 38 related evaluation includes all the features as stated above. Additionally, upon completion of the evaluation related to each selected ergonomic zone 38, the evaluation subsystem 24 is further operative to display each three-dimensional ergonomic zone 38 along with the related three-dimensional component or parameters of the configured workstation linked to the violation. The evaluation subsystem 24 is adaptive to flag a section of the component or parameters to display an exact location of where a violation occurred on the component.

In operation, using the system-interface tool 20, the system user requests a selected workstation template 26, such as an Instrument Panel Secure workstation template. The system-interface tool 20 sends the retrieval request to the rendering module 34 of the configuration subsystem 22. As shown in FIG. 4, upon receipt of the retrieval request, the rendering module 34 receives and displays to the system user the Instrument Panel Secure workstation template 26 along with default settings for the vehicle reference parameters.

Additionally, the rendering module 34 identifies and retrieves the two default human models, using the two human identifiers within the Instrument Panel Secure workstation template 26, to display along with the Instrument Panel Secure workstation template 26. The two default human models include a large male operator 30*a* and a small female operator 30*b*. Additionally, the system user selects a new human-operator model 30, such as the large male operator, to conduct an evaluation. The system user also selects a vehicle model data 28, such as a utility vehicle, from a first drop down dialog box. The system-interface tool 20 sends the retrieval request for the selected the utility model to the rendering module 34 to configure the Instrument Panel Secure workstation template 26.

Upon receipt of the retrieval request for the utility model, the rendering module 34 receives the utility model 28 and configures the Instrument Panel Secure workstation template 26 for the utility model 28 and the large male operator 30*a*. The rendering module 34 then displays the utility model 28 in a configured Instrument Panel Secure workstation template to the system user. Additionally, the rendering module 34 sends the workstation identifier to the evaluation subsystem 24 to retrieve related subset of the ergonomic design rules 32 related to Instrument panel secure workstation template 26.

Using the system-interface tool 20, the system user retrieves the ergonomic design rules 32 related to a particular manufacturing task or function related to the Instrument Panel Secure workstation template 26. Using the system-interface tool 20, the system user must select the task or function related to the selected workstation that is needed perform for the current study. For example, the system-interface tool 20 displays a list of manufacturing tasks and functions related to the Instrument Panel Secure workstation for the large male operator 30*a* to perform during the current study.

In order to secure the instrument panel to the selected vehicle 28, two nuts must be affixed to the right side and the left side of the vehicle. The steps for the right side and the left side of the vehicle are the same, thus, for this example only, the steps for the left side of the selected vehicle will be listed. The steps or tasks for securing the instrument panel for the left side of the vehicle include: obtain two nuts, obtain pistol grip nut runner, load a nut onto the nut runner, secure first nut, and secure second nut. The system user selects one task or function from the list such as "secure first nut" of the instrument panel onto the selected vehicle. The system-interface tool 20 sends the request to the evaluation subsystem 24 to retrieve and display to the system user the ergonomic design rules 32 related to the configured Instrument Panel Secure workstation template and the task or function of "secure first nut."

Figure 5:
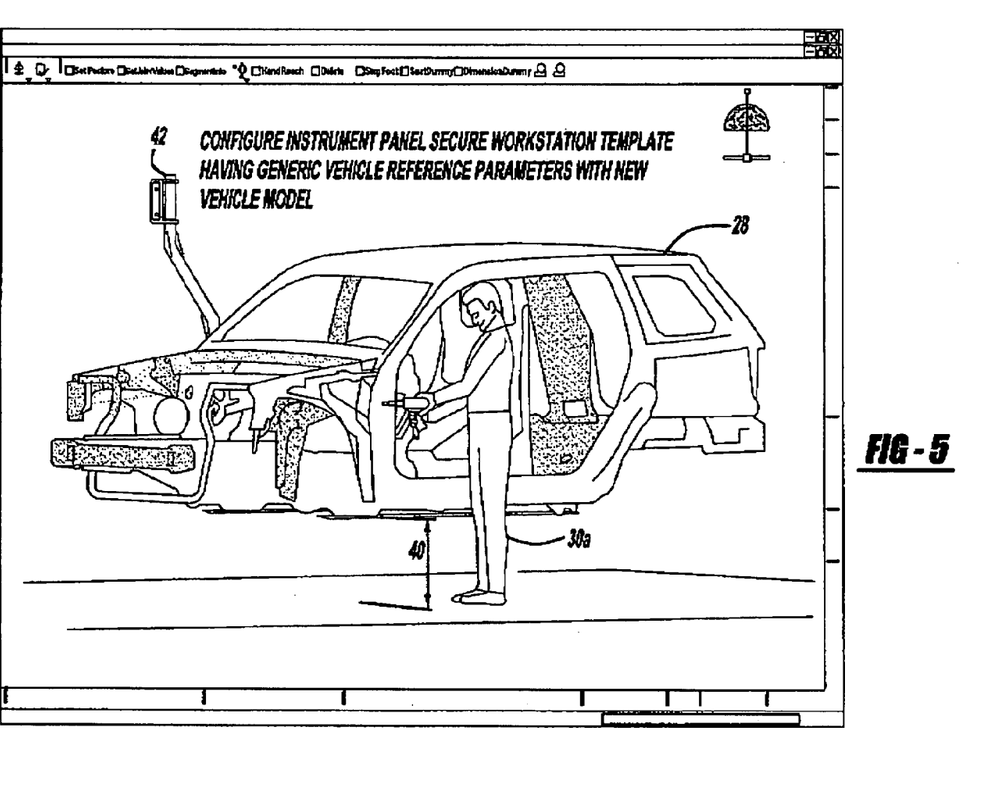
FIG. 5 is a perspective view of a configured workstation template in accordance with the present invention.

Additionally, the rendering module 34 loads and displays to the system user the utility model 28 in the configured Instrument Panel Secure workstation with the selected operator 30 in position to perform the task of "secure first nut" of the instrument panel onto the selected vehicle, as shown in FIG. 5. With a complete model ready for evaluation, the system user is allowed to determine whether any visual problems are observed or detected, using the retrieved list of design rules. If visual problems are detected (e.g. the selected operator 30 installs a device that is out of arm reach or the selected operator 30 does not have enough head clearance), the system user may modify the parameters of the configured Instrument Panel Secure workstation template using the system-interface tool 20.

Figure 6:
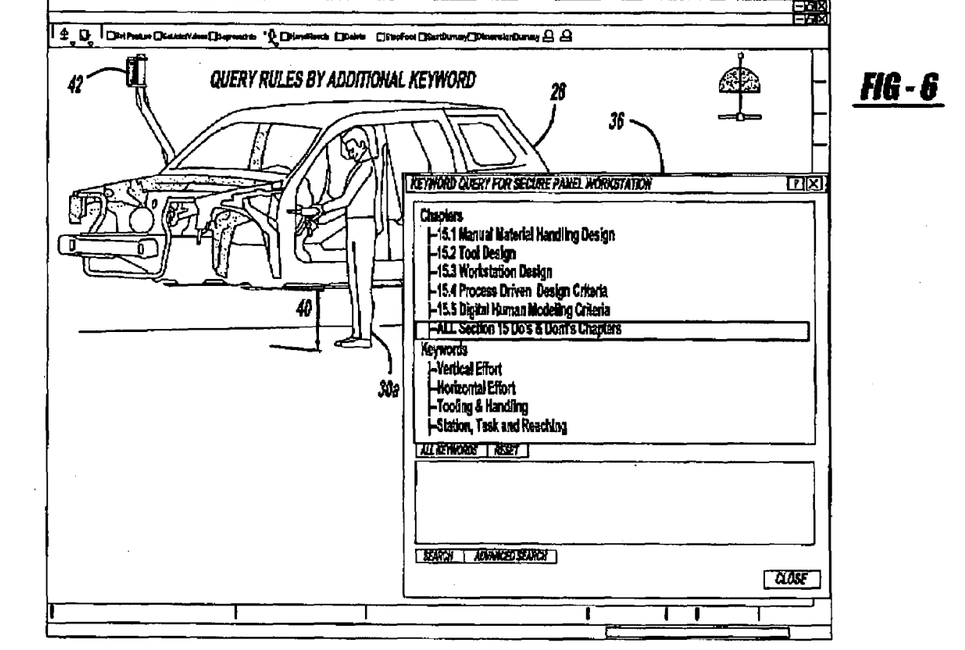
FIG. 6 is a perspective view of a query tool for a keyword related query in accordance with the present invention.
Figure 7:
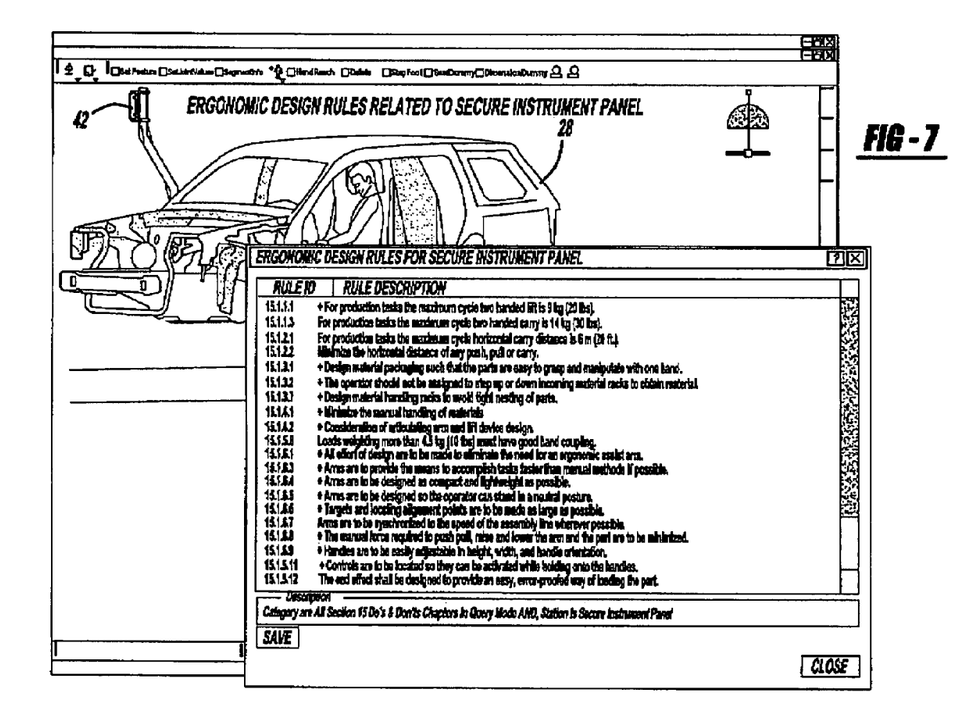
FIG. 7 is a perspective view of a first query list using the key word related query in accordance with the present invention.
Figure 8:
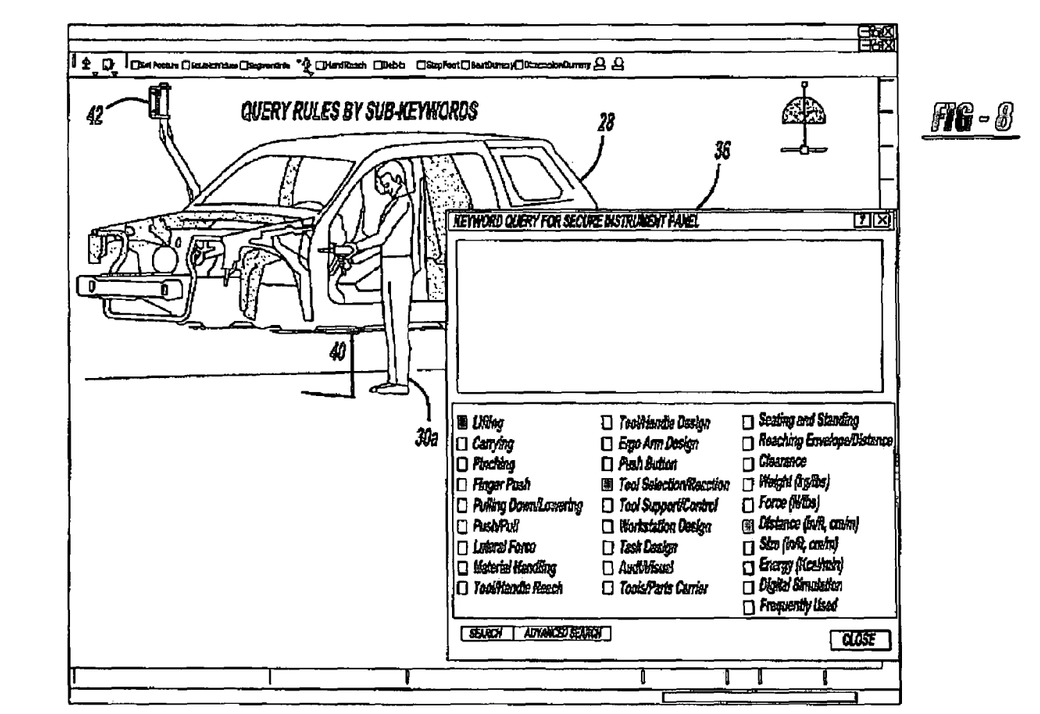
FIG. 8 is a perspective view of the query tool for a sub-keyword related query in accordance with the present invention.
Figure 9:
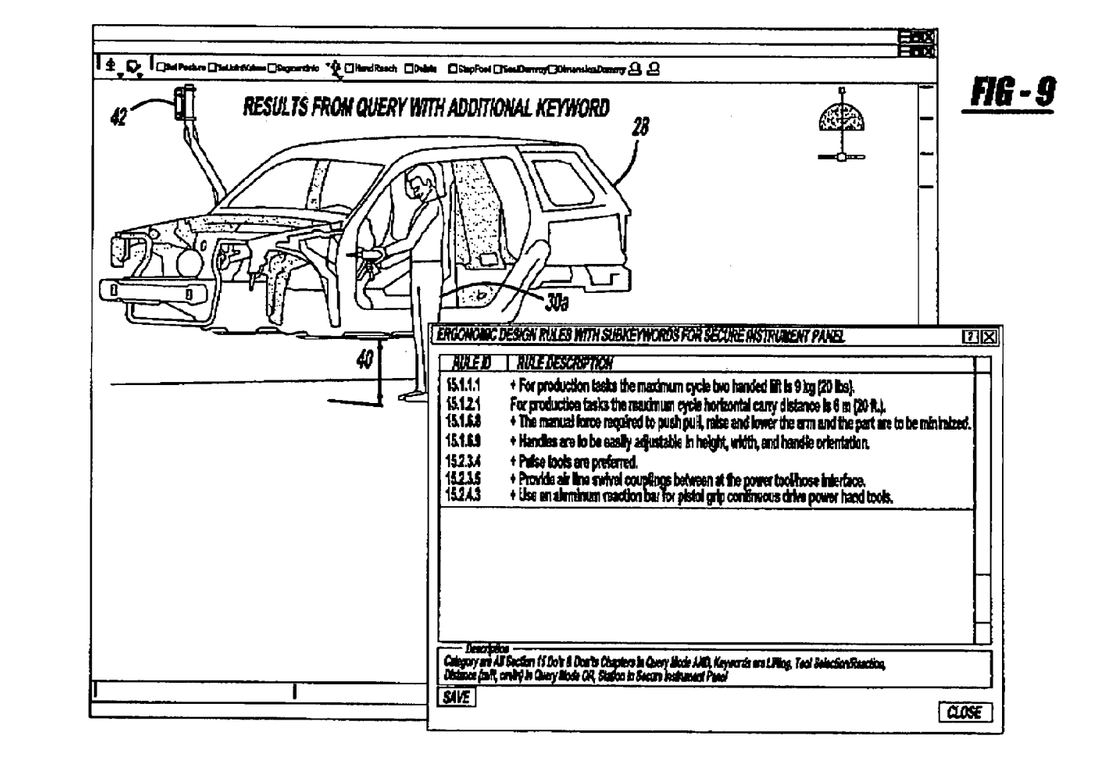
FIG. 9 is a perspective view of a second query list using the sub-keyword related query.

After the system user determines that no visual defects exist or modifies the parameters of the configured Instrument Panel Secure workstation, the evaluation subsystem 24 allows the system user to query the ergonomic design rules 32. The system user may conduct a query using the rule pop-up feature or selecting at least one keyword and/or at least one sub-keyword. Referring to FIG. 6, using the query tool 36, the system user may narrow or select the entire retrieved list of the ergonomic design rules 32 related to the configured Instrument Panel Secure workstation template. After selecting one or several keywords, the query tool 36 retrieves and narrows the retrieved list and produces a first queried list based on Instrument Panel Secure workstation template 26 and selected keywords, as shown in FIG. 7. Additionally, in order to further narrow a search of the ergonomic design rules 32 related to the Instrument Panel Secure workstation template 26, using the query tool 36, the system user may select from a list of predetermined sub-keywords, as shown in FIG. 8. After executing a search or query function, the query tool 36 displays the new queried list to the system user, as shown in FIG. 9.

Figure 10:
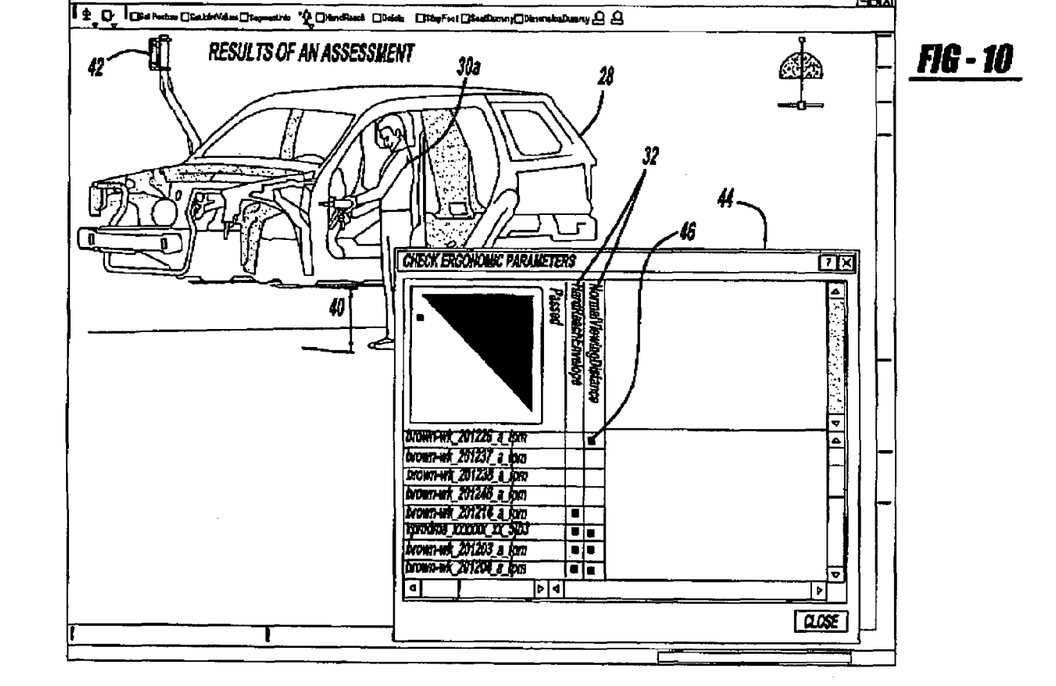
FIG. 10 is a perspective view of an assessment produced after an evaluation of the configured workstation template and three dimensional ergonomic zone with respect to a retrieved list of ergonomic design rules.

After receiving a selected list of the ergonomic design rules 32, the system user may evaluate the configured Instrument Panel Secure workstation template, using the selected list. Using the system-interface tool 20, the system user may request a comparison of the configured Instrument Panel Secure workstation template and the selected list of the ergonomic design rules 32. The evaluation subsystem 24 compares the configured Instrument Panel Secure workstation template to the ergonomic design rules 32 and produces an assessment as shown in FIG. 10. Using the system-interface tool 20, the system user may save the current ergonomic study for a later reference. Additionally, the system user may modify the configured Instrument Panel Secure workstation template to re-evaluate a newly configured Instrument Panel Secure workstation template to produce a new assessment.

After the evaluation subsystem 24 has completed its analysis, the assessment is displayed to the system user. The assessment includes each ergonomic design rule test, a location of the vehicle where the test was conducted, and result indicator. As shown in FIG. 10, the assessment may be displayed in a chart form 44 with color-code indicators 46, where green indicates no change is needed, red indicates that a modification or change is needed, or yellow indicates that a design change may be need, but is not necessary.

Figure 11:
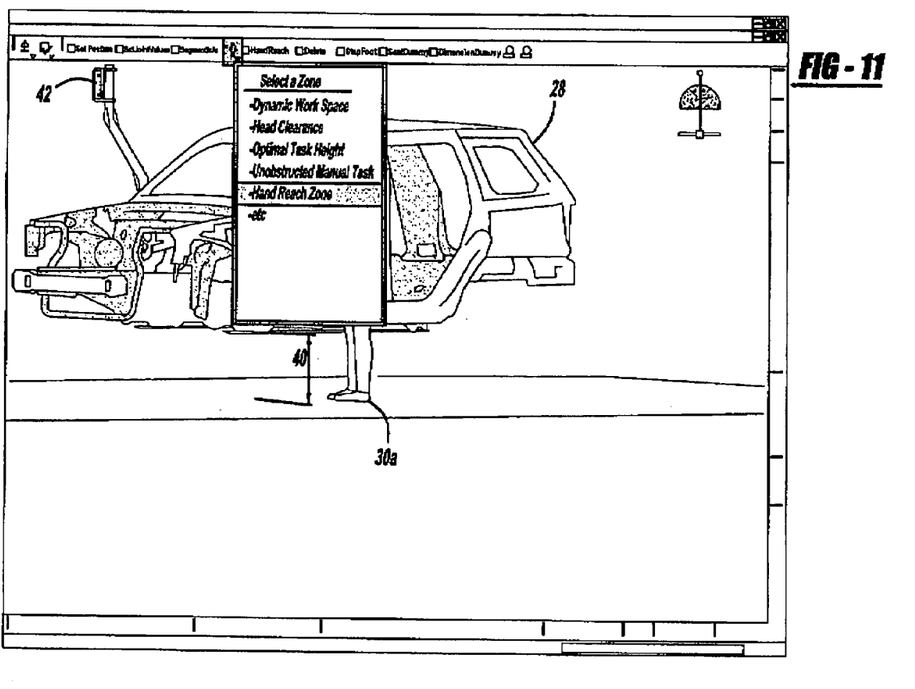
FIG. 11 is a diagrammatic view of a drop-down dialogue box of a system-interface tool with a plurality of ergonomic zones, in accordance with the present invention.
Figure 12:
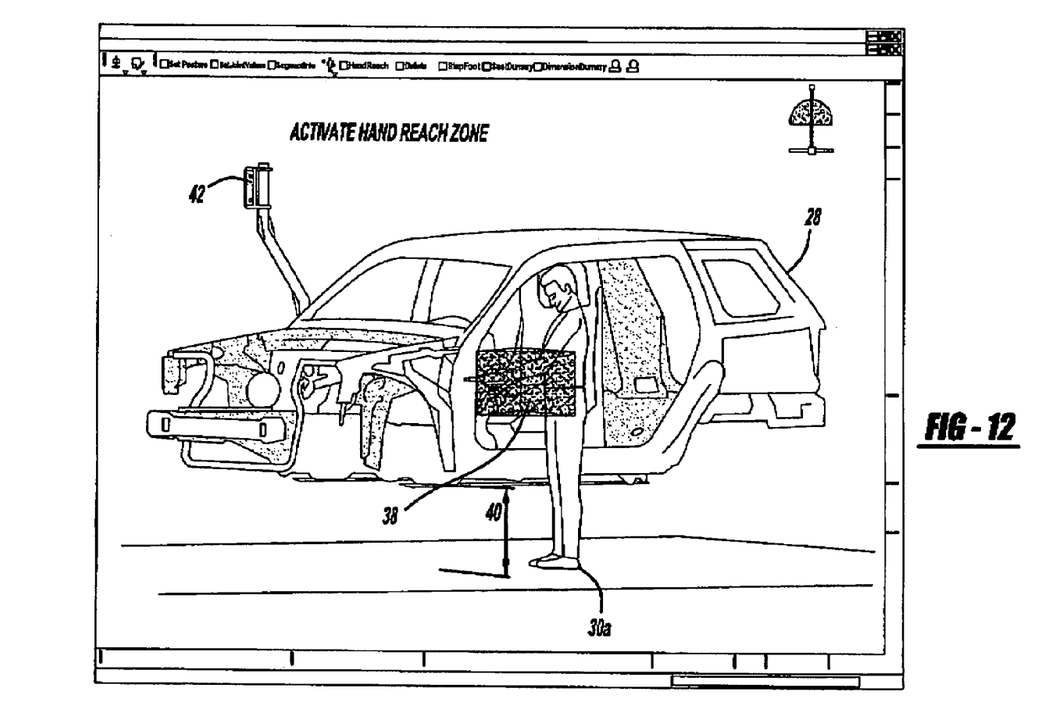
FIG. 12 is a perspective view of an ergonomic zone place adjacent to a human-operator model and the configured workstation template in accordance with the present invention.
Figure 13:
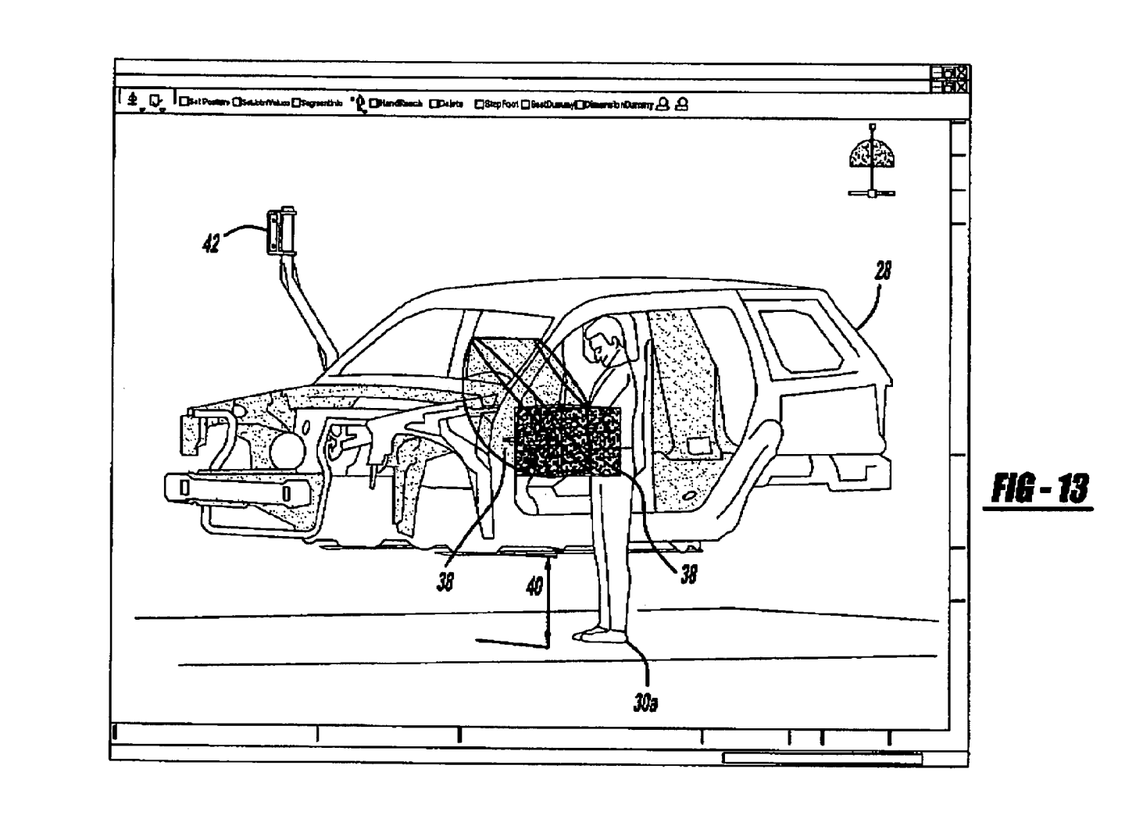
FIG. 13 is a perspective view of a plurality of ergonomic zones placed adjacent to the human-operator model and the configured workstation template in accordance with the present invention and, FIG. 14 is a perspective view of an assessment of a component with along with the ergonomic zone studied during an evaluation in accordance with the present invention.

As shown in FIG. 11, the system user may also evaluate the configured Instrument Panel Secure workstation template using one or multiple ergonomic zones 38. Using the system-interface tool 20, the system user selects one or multiple ergonomic zones 38 using a dialog drop down menu, such as a Hand Reach Zone. Upon receipt of the request from the system-interface tool 20, the evaluation subsystem 24 retrieves and creates the Hand Reach Zone on the large male operator 30*a*, as shown in FIG. 12. FIG. 13 discloses an example of the evaluation subsystem 24 retrieving and creating multiple ergonomic zones 38 on the large male operator 30*a*.

After displaying the Hand Reach Zone on the large male operator 30*a*, the evaluation subsystem 24 automatically checks and compares each selected ergonomic zone to the configured Instrument Panel Secured workstation template. An automatic check includes the clearance checking and the rule checking using each selected ergonomic zone on the large male operator 30*a* while performing the task of "secure first nut" of the instrument panel onto the utility model. After the automatic checking is complete, the evaluation subsystem 24 produces a new assessment.

Figure 14:
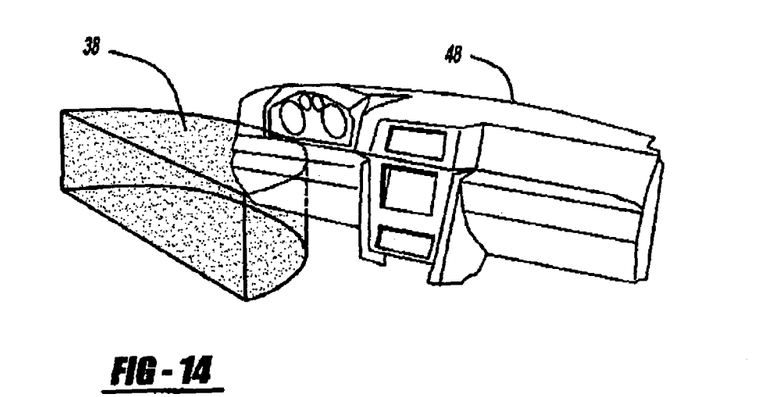

As shown in FIG. 14, a component 48 along with the violated ergonomic design rule 32 is flagged to notify the system user where the violation occurred. After informing the system user of the analysis, the evaluation subsystem 24 is operative to allow the system user to determine whether a design change is needed. If the design change is needed, the system user may modify the parameters of the configured Instrument Panel Secure workstation template using the system-interface tool 20. If the design change is not needed, the system user may save the current ergonomic study for a future reference, using the system-interface tool 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer-implemented ergonomic system embodied on a computer-readable medium for designing manufacturing workstations, comprising:

a data store for storing ergonomic design rules which govern the design process as it pertains to human operators functioning in a manufacturing workstation;

a data store for storing three-dimensional model data for a plurality of manufacturing workstation templates, where each manufacturing workstation template includes a link to the ergonomic design rules that pertains to specific manufacturing workstations;

a data store for storing three-dimensional model data for a vehicle to be manufactured in one of the plurality of manufacturing workstations;

a rendering module configured to receive input indicative of a particular manufacturing workstation selected by a system user and operable to display a three-dimentional module of the vehicle residing in the selected manufacturing workstation; and an interactive query tool in data communication with the rendering module and configured to present a subset of the ergonomic design rules to the system user in conjunction with the display of the three-dimensional model of the vehicle residing in the selected manufacturing workstation, where the subset of ergonomic design rules pertains to the particular manufacturing workstation.

2. The computer-implemented ergonomic system in claim 1, wherein the ergonomic design rules defines a threshold for at least one of the parameters associated with the selected manufacturing workstation.

3. The computer-implemented ergonomic system in claim 1, further comprising:

a data store for storing three-dimensional model data for a plurality of operators, wherein each operator conducts one of a plurality of steps in a process of manufacturing the vehicle in the manufacturing workstation, and wherein the rendering module is configured to receive at least one operator selected by the system user and operable to display the at least one operator along with the vehicle residing in the selected manufacturing workstation.

4. The computer-implemented ergonomic system in claim 3, wherein the plurality of operators include at least one large mare operator and at least one small female operator.

5. The computer-implemented ergonomic system in claim 3, wherein at least one ergonomic design rule is created into a three-dimensional ergonomic zone, and wherein the three-dimensional ergonomic zone is placed adjacent to the at least one operator to determine whether the at least one operator violates the at least one ergonomic design rule while performing a step in a manufacturing process related to the configured workstation and the vehicle.

6. The computer-implemented ergonomic system in claim 5, wherein the three-dimensional ergonomic zone is indicative of a three-dimensional region defined by at least one threshold parameter for the at least one operator.

7. The computer-implemented ergonomic system in claim 5, wherein the rendering module is operative to evaluate a clearance or interference check of the at least one operator while located adjacent to the three-dimensional ergonomic zone, wherein the at least one operator is evaluated while conducting a step in a manufacturing process for the selected manufacturing workstation and vehicle.

8. The computer-implemented ergonomic system in claim 5, wherein the rendering module is operative to evaluate an ergonomic design rule checking of the at least one operator while adjacent to the three-dimensional ergonomic zone, wherein the at least one operator is evaluated while conducting a step in a manufacturing process for the selected manufacturing workstation and vehicle.

9. The computer-implemented ergonomic system in claim 1, further comprising an evaluation subsystem, coupled to the interactive query tool and in data communication with the rendering module wherein the evaluation subsystem is operative to evaluate the selected manufacturing workstation in relation to ergonomic design rules.

10. The computer-implemented ergonomic system in claim 9, wherein the evaluation is further operative to display an assessment to the system user to provide an indication of whether the manufacturing workstation passed selected ergonomic design rules.

11. The computer-implemented ergonomic system in claim 1, wherein the rendering module is further operative to allow the system user to modify parameters of the manufacturing workstation template.

* * * * *